United States Patent
Kuschke et al.

(10) Patent No.: US 8,291,142 B2
(45) Date of Patent: Oct. 16, 2012

(54) METHOD, BUS COMPONENTS, AND CONTROL SYSTEM FOR ETHERNET-BASED CONTROL OF AN AUTOMATION SYSTEM

(75) Inventors: Detlev Kuschke, Schieder-Schwalenberg (DE); Michael Hoffmann, Oerlinghausen (DE)

(73) Assignee: Phoenix Contact GmbH & Co. KG (DE)

( * ) Notice: Subject to any disclaimer, the term of this patent is extended or adjusted under 35 U.S.C. 154(b) by 231 days.

(21) Appl. No.: 12/421,817

(22) Filed: Apr. 10, 2009

(65) Prior Publication Data
US 2010/0211711 A1    Aug. 19, 2010

(30) Foreign Application Priority Data
Apr. 11, 2008 (DE) .................. 10 2008 018 633

(51) Int. Cl.
*G06F 13/42* (2006.01)
(52) U.S. Cl. .............. 710/105; 710/306; 710/315
(58) Field of Classification Search .............. 710/105, 710/106, 110, 306, 315, 33, 34, 45; 370/392, 370/395.4, 395.5, 466, 467, 470, 471
See application file for complete search history.

(56) References Cited

U.S. PATENT DOCUMENTS

| | | | |
|---|---|---|---|
| 7,796,589 B2* | 9/2010 | Cohen et al. | 370/389 |
| 2005/0025182 A1* | 2/2005 | Nazari | 370/469 |
| 2005/0083954 A1* | 4/2005 | Meyer-Grafe | 370/403 |
| 2006/0041630 A1 | 2/2006 | Naismith | |
| 2006/0109866 A1* | 5/2006 | Janssen et al. | 370/493 |
| 2006/0212604 A1* | 9/2006 | Beckhoff et al. | 709/251 |
| 2006/0274746 A1* | 12/2006 | Kuschke et al. | 370/389 |
| 2007/0076243 A1* | 4/2007 | Janssen et al. | 358/1.15 |
| 2010/0208586 A1* | 8/2010 | Papenfort et al. | 370/230 |

FOREIGN PATENT DOCUMENTS

| | | |
|---|---|---|
| EP | 1530104 A2 | 5/2005 |
| EP | 1590927 B1 | 7/2006 |

OTHER PUBLICATIONS

Guido Reeck, "EP Patent Application No. EP 09 00 5300 Search Report", Jul. 7, 2009, Publisher: EPO, Published in: EP.
German Office Action, dated Jul. 2, 2012 of German Patent Application No. 10 2008 018 633.3.
Gateway (Informatik).

* cited by examiner

*Primary Examiner* — Khanh Dang
(74) *Attorney, Agent, or Firm* — Kaplan Breyer Schwarz & Ottesen, LLP (57) ABSTRACT

A method is disclosed in which data is exchanged via a bus coupler (500) between a network (410) designed for transmitting Ethernet telegrams and a lower-level bus system (420), wherein the bus coupler (500) is connected via a first interface (520) to the network (410) and via a second interface (530) to the lower-level bus system (420), and wherein process data is read in and/or output through at least one bus node (610, 620, 630) of the lower-level bus system (420).

Furthermore, a bus coupler (500), a bus node (610, 620, 630), and a control system (10) that are designed for execution of the method are disclosed.

15 Claims, 4 Drawing Sheets

METHOD, BUS COMPONENTS, AND CONTROL SYSTEM FOR ETHERNET-BASED CONTROL OF AN AUTOMATION SYSTEM

FIELD OF THE INVENTION

The invention relates, in general, to automation systems and, in particular, to a method, a bus coupler, a bus node, and a control system for real-time control of an automation system.

BACKGROUND OF THE INVENTION

In automation systems, Ethernet-based field-bus systems are being used more and more. Based on the Ethernet protocol, these systems use an Ethernet data frame for responding to a connected device. However, an Ethernet data frame features not-insignificant overhead to the data, so that, for example, a simple digital field device with, for example, only 8 digital outputs must receive a data frame that is composed of at least 72 bytes. If many field devices that require only very little user data are used in an Ethernet-based system, the Ethernet protocol is very inefficient and makes the system slow.

Another disadvantage of an Ethernet-based field-bus system is the requirement that each node must be physically equipped with an Ethernet interface, despite the fact that often only small distances must be bridged. This leads to unnecessarily high costs. Another disadvantage of the Ethernet interface is that the conversion into digital signals generates a not-insignificant delay, which must be taken into consideration when there are many nodes in a system. Therefore, Ethernet-based field-bus systems can be used only to a limited extent for real-time applications in the field of automation systems.

For the execution of control tasks in real time, it is known, from EP 1 590 927 B1, to connect the nodes for the real-time application in a ring-shaped transmission path, wherein this ring-shaped transmission path is connected via a network coupler to a network over which Ethernet telegrams can be transmitted. The network coupler is here designed so that an Ethernet telegram received from the network via an external interface of the network coupler is forwarded to an internal interface of the network coupler and output over the ring-shaped transmission path, wherein, when the Ethernet telegram circulates over the ring-shaped transmission path, each node connected to the ring-shaped transmission path exchanges the user data designated for each node with the Ethernet telegram as it circulates over the ring-shaped transmission path. Real-time requirements could be maintained by reducing the response time of the individual nodes through the processing of the Ethernet telegrams on the ring-shaped transmission path in the passage through the nodes connected to this transmission path.

However, one disadvantage of the method described in EP 1 590 927 B1 is that the Ethernet telegram circulating on the ring-shaped transmission path has at least 72 bytes and thus features the overhead to the data described above. Furthermore, the use of the ring-shaped transmission path leads to jitter that limits the ability to maintain real-time requirements.

SUMMARY OF THE INVENTION

The invention is therefore based on the problem of disclosing a way of improving the control of automation systems, especially in real time, incorporating an Ethernet-based network, so that the disadvantages described above can be avoided.

Another problem of the invention is to disclose a means of providing and operating, in the most efficient way possible, a real-time-capable Ethernet-based control system with a plurality of nodes and, simultaneously, low costs for each node.

Another problem of the invention is to disclose a real-time-capable Ethernet-based control system that features a high data transfer rate and/or satisfies strict real-time requirements, as well as to specify a method for its operation.

Accordingly, the invention provides a method for process control in which data is exchanged between a network formed for transmitting Ethernet telegrams and a lower-level bus system via a bus coupler, also called a network coupler below, wherein the bus coupler is connected via a first interface to the network and via a second interface to the lower-level bus system and wherein process data is read in and/or output by at least one bus node of the lower-level bus system. The method can be used in an especially advantageous way for the real-time control of an automation system and provides for the reception of an Ethernet telegram via the first interface of the bus coupler; the conversion of the received Ethernet telegram into an internal data telegram that has, in particular, a shorter data length than the received Ethernet telegram; and the output of the internal data telegram via the second interface of the bus coupler to the bus node of the lower-level bus system. The lower-level bus system can be advantageously formed as a ring-shaped transmission path.

Through the protocol conversion in the bus coupler, in an especially advantageous way, overhead to the data for the internal data telegram output to the bus node of the lower-level bus system is eliminated. For this purpose, certain data contained in the Ethernet telegram is not incorporated into the internal data telegram. Advantageously, only data from the data area of the Ethernet telegram is incorporated, but not data of the so-called header and trailer. In particular, the data contained in the preamble, in the SFD field (Start Frame Delimiter), in the address fields for the target and source addresses, in the type/length field, and in the FCS field (Frame Check Sequence) of the Ethernet telegram is not incorporated. Advantageously, however, the data that is incorporated from the Ethernet telegram is incorporated unchanged into the internal data telegram. The protocol conversion in the bus coupler thus does not include the conversion of the Ethernet telegram into a different standard protocol.

Advantageously, the network is an industrial Ethernet network that is especially adapted for automation systems, particularly for applications with real-time requirements, and that is based on, for example, the Profinet standard. However, the invention could also of course be used in networks that support other known Ethernet-based real-time protocols.

Advantageously, the lower-level bus system is formed as a ring-shaped bus system, wherein the data transfer between the bus coupler and the bus nodes of the lower-level bus system advantageously takes place by means of a sum frame protocol, wherein the internal data telegram is circulated as a sum frame over the ring-shaped bus system. Furthermore, the data transfer within the lower-level bus system advantageously takes place according to the master/slave principle, wherein the bus coupler forms the master and the bus nodes form the slaves.

For the use of a sum frame protocol, for each bus node, a data block is provided within the sum frame, that is, within the internal data telegram that each bus node can access and in which data can be written and/or from which data can be read.

Accordingly, the Ethernet telegram to be received from the bus coupler is advantageously generated by a control unit formed for controlling the bus nodes connected to the lower-level bus system and is transferred via the network to the bus coupler, wherein individual data for a plurality of bus nodes connected to the lower-level bus system is contained in the data field of the Ethernet telegram.

Advantageously, the method also obviously provides for the conversion of an internal data telegram with which the bus nodes of the lower-level bus system have exchanged data and which has again been received, after passage over the ring-shaped bus, by the bus coupler as the master of the lower-level bus system into an Ethernet telegram, and the method provides for the output via the first interface of the bus coupler to the Ethernet-based network.

For this purpose, advantageously, the data contained in an Ethernet telegram received by the bus coupler, for example, addressing data that was not incorporated into the allocated internal data telegram can be buffered in the bus coupler.

Furthermore, management data for controlling at least one bus node of the lower-level bus system can be advantageously generated by the bus coupler and inserted into the internal data telegram without disrupting the time response of the data transfer between a control unit connected to the Ethernet-based network and the bus nodes of the lower-level bus system.

Advantageously, because an internal data telegram, reduced in length compared with the Ethernet telegram, is circulated over the ring-shaped, lower-level bus system instead of an Ethernet telegram, in an especially advantageous way, a higher data transfer rate to the bus nodes of the lower-level bus system is achieved, wherein stricter real-time requirements can be maintained.

For real-time applications in automation systems, the precise observance of cycle times and thus the simultaneous input and output of process information to and from the process through different input and output devices is especially important. Through the use of a sum frame protocol and an advantageously close positioning of the bus nodes of the lower-level bus system, the synchronicity of the bus nodes is supported. However, jitter cannot thus be completely prevented.

In order to prevent or at least reduce the remaining jitter, the invention provides, in an especially advantageous way, for the bus nodes of the lower-level bus system to be formed such that the LatchIN and LatchOUT times of the bus nodes can be parameterized. The LatchOUT time here designates the time at which data is output to the process by the appropriate bus node, and the LatchIN time designates the time at which new data is read in from the peripheral, for example, a sensor, through the bus node.

Accordingly, in an especially advantageous way, the method provides that at fixed, predetermined time intervals, internal data telegrams are output from the bus coupler to the bus nodes of the lower-level bus system, wherein the method includes the steps of the allocation of at least one output and/or read-in time interval for at least one of the bus nodes of the lower-level bus system, the identification by the one or more bus nodes of an output and/or read-in start time allocated by the internal data telegram circulating on the lower-level bus system, and, after the allocated output time interval has elapsed and after identification of the output start time by the one or more bus nodes, the output of process data, and/or, after the allocated read-in time interval has elapsed and after identification of the read-in start time, the input of process data. The output and/or read-in start time is here allocated advantageously by a tag within the internal data telegram or alternatively by the end of the internal data telegram. Advantageously, different tags could be provided for the output and read-in start times. However, the same tag could also be provided at different positions of the internal data telegram, wherein the tag is identified by each bus node as an output or read-in start time as a function of the position within the internal data telegram. The tags for allocating the output and/or read-in start times could each be provided according to requirements at any position within the internal data telegram.

In order to guarantee the maintenance of synchronous LatchIN and LatchOUT times for all bus nodes of the lower-level bus system, different output and/or read-in time intervals are allocated in an especially advantageous way for each bus node of the lower-level system as a function of the corresponding position within the lower-level bus system such that an output and/or read-in of process data takes place simultaneously for all bus nodes of the lower-level bus system.

In the simplest configuration, the internal data telegram has a start character, a data area, and an end character. Furthermore, in an especially simple implementation of the method, when the Ethernet telegram is converted into the internal data telegram, the data area of the Ethernet telegram is copied unchanged into the data area of the internal data telegram. For this implementation of the internal data telegram, the tags described above for allocating the output and/or read-in start times can be included, for example, in the start or end characters, within the data area, or between the start character and data area, or between the data area and end character.

According to the Ethernet standard, an Ethernet telegram has a minimum length of 72 bytes, where the data field of an Ethernet telegram has a minimum length of 46 bytes. If less than 46 bytes of data is to be transferred with an Ethernet telegram, then filler data is inserted into the data area of the Ethernet telegram in order to maintain the stipulated minimum lengths.

In order to guarantee the smallest possible data length of the internal data telegram, the method advantageously provides that user data and filler data contained in the data area of the Ethernet telegram is identified and that only the user data is incorporated into the internal data telegram.

A bus coupler according to the invention, for exchanging data between a network formed for transmitting Ethernet telegrams and a lower-level bus system, has a first interface for connection to the network, a second interface for connection to the lower-level bus system, and a control unit that is designed for converting an Ethernet telegram received via the first interface into an internal data telegram and for outputting the internal data telegram via the second interface, wherein the internal data telegram has, specifically, a shorter data length than the received Ethernet telegram.

A bus node according to the invention for connecting to a ring-shaped bus system has a variably adjustable value stored in a memory for an output and/or read-in time interval, and is designed for exchanging data with a bus master on the basis of a sum frame protocol; for identifying an output and/or read-in start time allocated by the data frame being passed on the bus system; and for outputting process data after the allocated output time interval has elapsed and after the identification of the output start time, and/or for reading in process data after the allocated read-in time interval has elapsed and after the identification of the read-in start time. Advantageously, the output and/or read-in start times are allocated in turn by corresponding tags within the internal data telegram or by the end of the internal data telegram.

A control system according to the invention for real-time control of an automation system is designed for the execution of a method described above, and for this purpose has a network that is designed to transmit Ethernet telegrams and a lower-level bus system below the network; a bus coupler, as described above, that is connected to the network and to the lower-level bus system; and at least one bus node connected to the lower-level bus system, as described above.

Furthermore, advantageous embodiments of a bus coupler, a bus node, and a control system in which means are provided that are suitable for executing the advantageous implementations described above for the method according to the invention lie within the scope of the invention.

In contrast to the method described in EP 1 590 927 B1, the invention provides, in an especially advantageous way, the design of a network or bus coupler such that, instead of an Ethernet telegram, an internal data telegram, reduced in length compared with the Ethernet telegram, is output by this network or bus coupler onto the lower-level bus system.

Accordingly, also lying within the scope of the invention is a network coupler with an external interface for connecting to a network over which Ethernet telegrams can be transmitted and an internal interface for connecting a plurality of nodes in series in a ring-shaped transmission path, wherein a data telegram that is reduced in length compared with the Ethernet telegram is generated from an Ethernet telegram received via the external interface, forwarded to the internal interface, and output onto the ring-shaped transmission path, and wherein, when the shortened data telegram is passed on the ring-shaped transmission path by each node, the corresponding node connected to the internal interface exchanges the user data designated for the node with the shortened data telegram being circulated on the transmission path, whereby the node can receive data from the data block allocated to the node in the data area of the shortened data telegram and can insert, on its side, data into the data block allocated to the node in the data area of the shortened data telegram.

Also lying within the scope of the invention is a method for exchanging data between a network, over which Ethernet telegrams can be transmitted, and a plurality of nodes via a network coupler, wherein the network is connected to an external interface of the network coupler, and the plurality of nodes is connected in series in a ring-shaped transmission path via an internal interface of the network coupler; wherein an Ethernet telegram received via the external interface of the network coupler is converted into a data telegram—reduced in length compared with the Ethernet telegram—that is forwarded to the internal interface of the network coupler and that is output onto the ring-shaped transmission path; and wherein, with the passage of the shortened data telegram over the ring-shaped transmission path by each node, the corresponding node connected to the internal interface exchanges user data designated for the node with the shortened data telegram as it circulates over the transmission path, whereby the node can receive data from the data block allocated to the node in the data area of the shortened data telegram and can insert, on its side, data into the data block allocated to the node in the data area of the shortened data telegram.

The network coupler just described and the method just described for exchanging data can be advantageously formed according to one or more of the advantageous embodiments of the invention described above.

BRIEF DESCRIPTION OF THE DRAWINGS

The invention will be described in more detail below using preferred embodiments and with reference to the accompanying drawings. Here, identical reference symbols in the drawings designate identical or similar parts.

Shown are.

DETAILED DESCRIPTION

Figure 1:
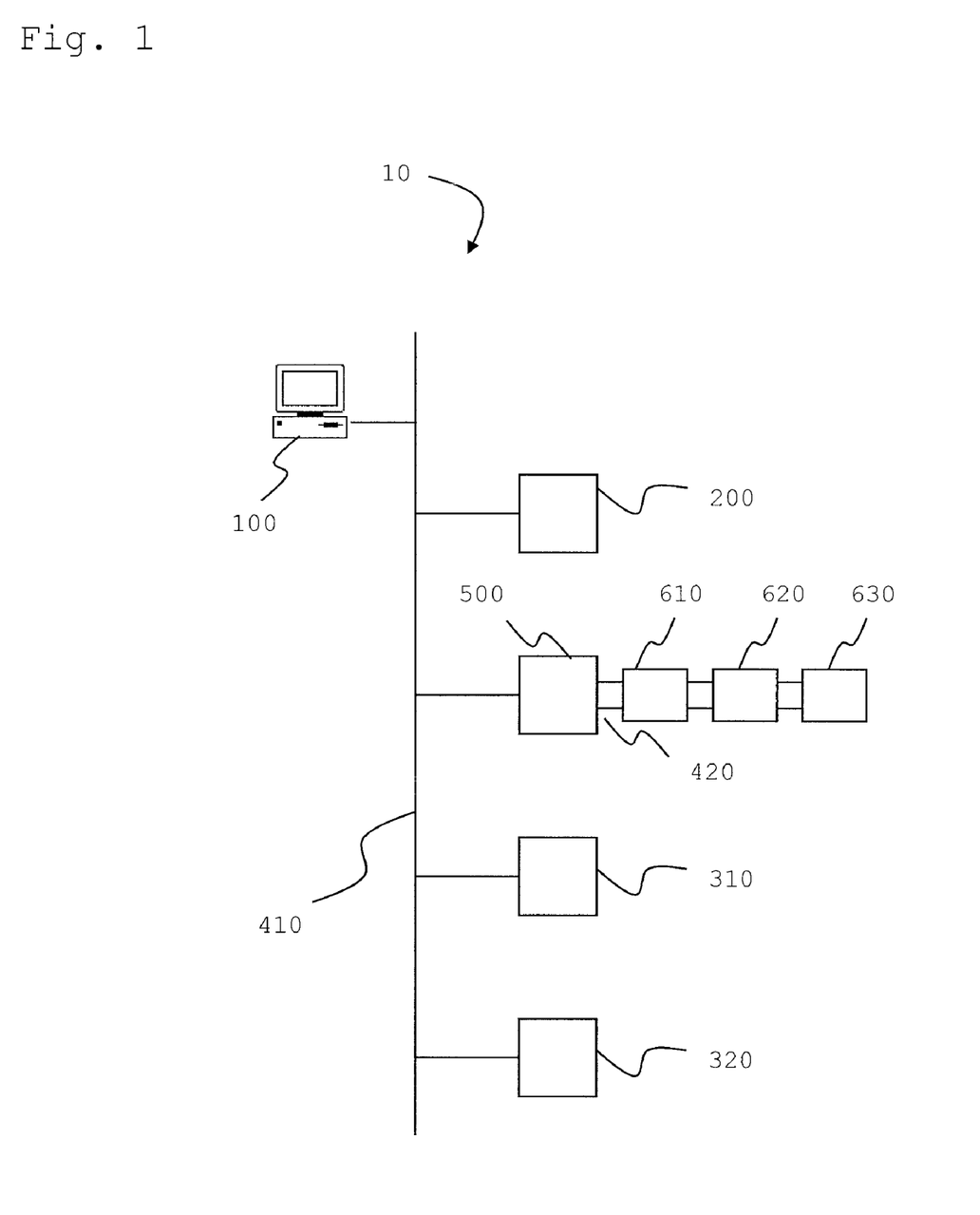
FIG. 1: a schematic diagram of a preferred embodiment of a control system according to the invention.

A control system 10 according to the invention formed for executing a method according to the invention is shown in FIG. 1. For controlling an automation system, the devices 100, 200, 310, 320, and 500 equipped with an Ethernet interface are connected to a network 410 formed for transmitting Ethernet telegrams. The network 410 is advantageously formed as a Profinet to which are connected, in the shown embodiment, a personal computer 100 for the configuration and visualization of the control process, a control unit 200 for the control of the process, and also, as an example, additional Ethernet-capable field devices 310 and 320. Furthermore, a bus coupler 500 for data exchange with a lower-level bus system 420 is connected to the network 410. In order to keep the cabling expense low, the devices connected to the network 410 are advantageously connected in series. The network 410, however, can also have any other suitable topology.

Figure 2:
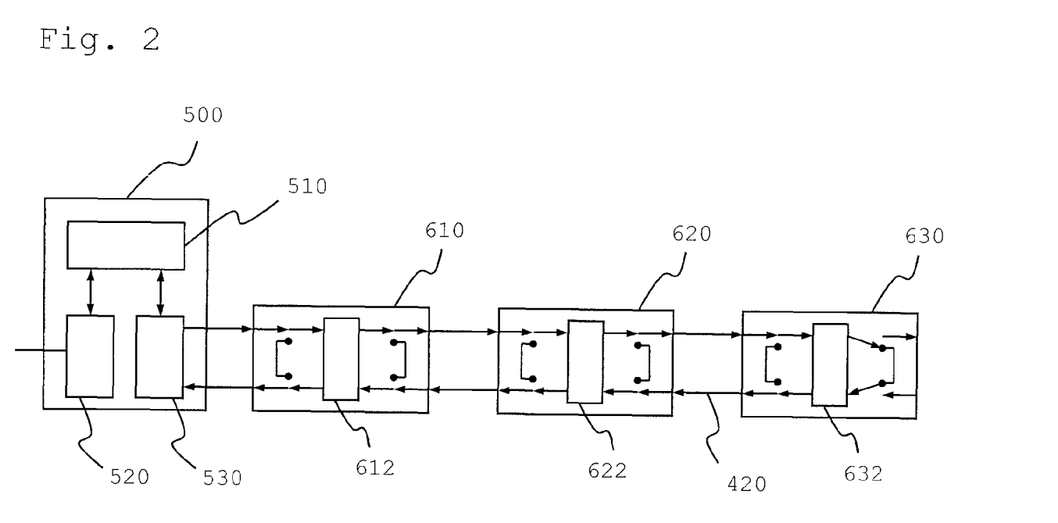
FIG. 2: schematically, the lower-level bus system contained in the control system shown in FIG. 1, FIG. 3: a schematic time diagram for illustrating the parameterizable latch times of the bus nodes of the lower-level bus system shown in FIG. 2, wherein the corresponding start times of the latch times are allocated by the end of the internal data telegram.

The invention provides for use of a common Ethernet frame that supplies data to the nodes for nodes with a low data width, such as the illustrated nodes 610, 620, and 630. As a linking element, a bus coupler 500 is used that has an Ethernet interface for connecting to the network 410 and that is formed as a master for controlling the lower-level bus 420 to which the bus nodes 610, 620, and 630 are connected. In FIG. 2, the bus coupler 500 used for connecting the lower-level bus system 420 is shown in detail. The bus coupler 500 has a first interface 520 for connecting to the Ethernet-based network 410, a second interface 530 for connecting to the lower-level bus system 420, and also a control unit 510 that is constructed to convert Ethernet telegrams received via the first interface into internal data telegrams and to output these via the second interface to the lower-level bus system 420.

The lower-level bus system 420 operates according to the master/slave system, wherein the bus coupler 500 that could also be formed as a PC contains the master functionality and the bus nodes 610, 620, and 630 represent the slaves, wherein the bus nodes are coupled in a logical ring to the master.

The bus nodes 610, 620, and 630 advantageously need not be equipped with an Ethernet interface since they are connected spatially in series very close to each other. As the protocol, Ethernet is not used in the lower-level bus system 420, but instead a unique protocol that has lower overhead. The logic components 612, 622, and 632 arranged in the corresponding bus nodes 610, 620, and 630 are connected such that the bus nodes 610, 620, and 630 are connected to each other in a ring-shaped transmission path, so that a sum frame protocol can be used.

The synchronicity of the nodes will be supported by the sum frame protocol and the low extent. The remaining jitter of the nodes will be further reduced by parameterizable LatchIN and LatchOUT times in the nodes, in order to be able to realize even shorter cycle times and to fulfill stricter real-time requirements.

Figure 3:
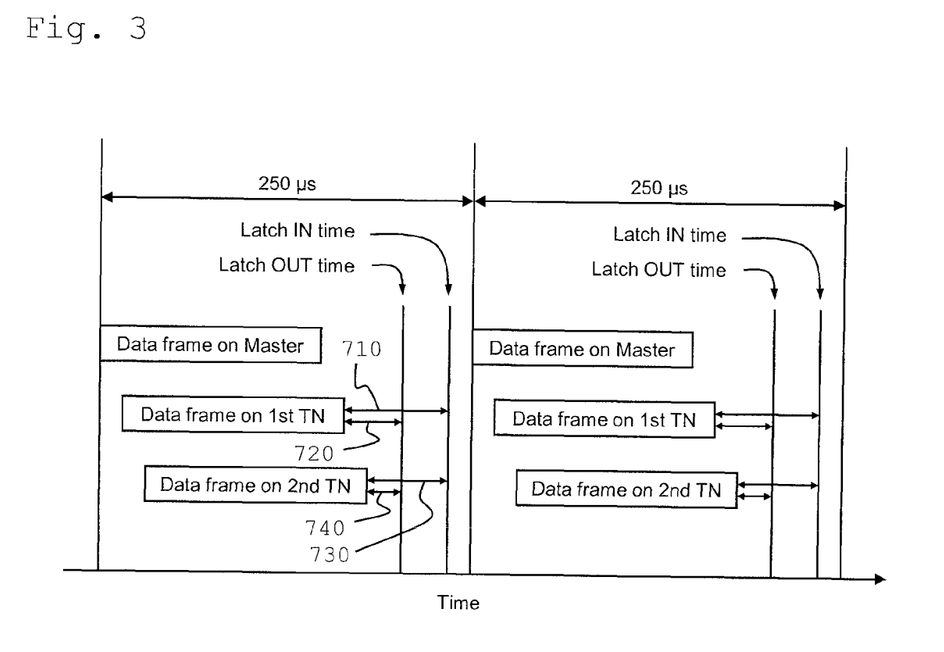
Figure 3A:
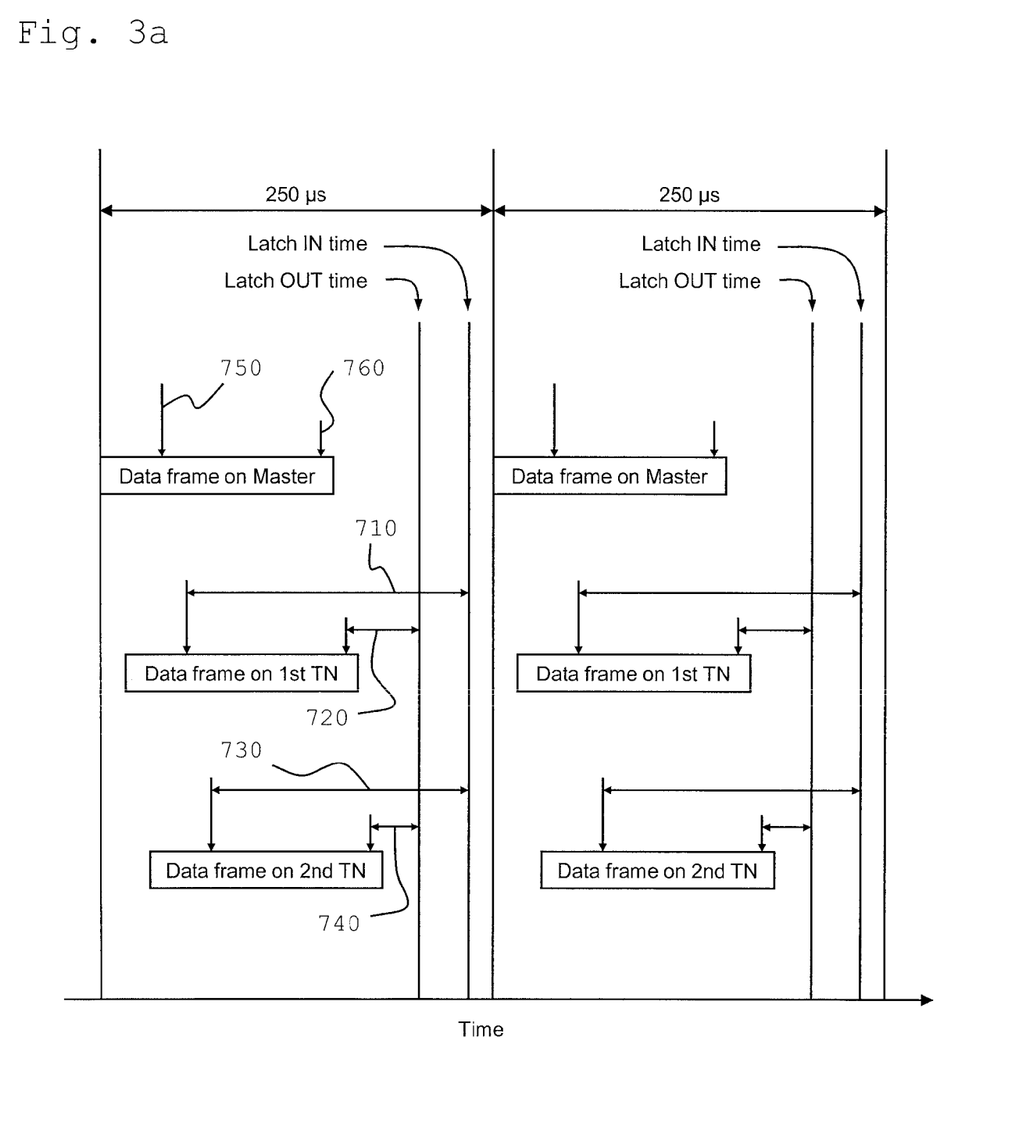
FIG. 3a: a schematic time diagram for illustrating the parameterizable latch times of the bus nodes of the lower-level bus system shown in FIG. 2, wherein the corresponding start times of the latch times are allocated by tags within the internal data telegram.

For this purpose, as shown in FIGS. 3 and 3*a*, internal data telegrams are output regularly at fixed, predetermined time intervals of, for example, 250 μs from the bus coupler 500 as the master to the bus nodes 610, 620, 630 as slaves of the lower-level bus system 420. For each of the bus nodes 610, 620, 630, for example, for parameterization of the control system 10, an output time interval and an input time interval are allocated and stored in the corresponding bus node.

Through different output and input time intervals of the bus nodes 610, 620, and 630, for all of the bus nodes the corresponding LatchIN and LatchOUT times are synchronized and therefore the jitter is reduced. Accordingly, the output and/or the reading-in of process data by the bus nodes 610, 620, and 630 that are constructed in the shown embodiment as I/O field devices for process control takes place after the allocated output or read-in time interval has elapsed, wherein the beginning of the corresponding time interval is defined by a corresponding output or read-in start time. In the embodiment shown in FIG. 3, both the output and also the read-in start time are defined by the time point at which the end of an internal data telegram circulating on the lower-level bus system is identified by the corresponding bus node. For the embodiment shown in FIG. 3*a*, tags 750 and 760 are provided within each internal data telegram circulating on the lower-level bus system, wherein the output start time is defined by the time at which the tag 760 is identified by the corresponding bus node and the read-in start time is defined by the time at which the tag 750 is identified by the corresponding bus node.

In each of FIGS. 3 and 3*a*, a timing diagram is shown schematically, in each of which the time period is specified during which the data frame defined by the corresponding internal data telegram is applied to the master, i.e., the bus coupler 500, and, for example, on the first and second nodes, where the first node corresponds to the bus node 610 and the second node corresponds to the bus node 620, as shown in FIG. 2. In FIGS. 3 and 3*a*, for the example first node, corresponding to the bus node 610, the output time interval for defining the LatchOUT time is designated by the reference symbol 720 and the read-in time interval for defining the LatchIN time is designated by the reference symbol 710. Accordingly, for the second node, corresponding to the bus node 620, the output time interval is designated by the reference symbol 740 and the read-in time interval is designated by the reference symbol 730. For the simplified illustration, the bus subscriber 630 shown in FIG. 2 is not taken into consideration in FIGS. 3 and 3*a*, but this is parameterized in an analogous way as the first and second nodes shown in FIGS. 3 and 3*a*.

In the Ethernet-based Profinet system 410, Ethernet data frames are generated by the Profinet controller 200 and sent to the different Profinet devices, such as the devices 310 and 320. Because the Profinet system is a real-time system, the times for LatchIN and LatchOUT of the process data are synchronized, so that data is exchanged on all Profinet devices simultaneously. Each device is allocated a fixed time at which its input and diagnosis data is transmitted as data frames to the controller 200.

The bus coupler 500 with its connected bus nodes 610, 620, and 630 is always to be seen as only one device in the Profinet system 410. The coupled bus nodes 610, 620, and 630 are managed as slots of the Profinet device. In order to provide the bus nodes 610, 620, and 630 with data, the Profinet data frame is received in the bus coupler 500 and the process data is written to a buffer memory. As the master of the lower-level bus system 420, the bus coupler 500 generates an internal data frame as a function of the buffered data and sends the data to the bus nodes 610, 620, and 630.

In order to maintain real-time capability, the output data is received in the bus nodes 610, 620, and 630 and switched actively according to the parameterization of each LatchOUT time. In the lower-level bus system 420, input data is read into the bus nodes 610, 620, and 630 at a certain time before the start of the next internal cycle. The latch time for each bus node can be parameterized, wherein it is especially important for the parameterization of the LatchIN that internal data frames in the lower-level bus system 420 always be sent at exact time intervals from the master 500. Each bus node 610, 620, and 630 identifies a read-in start time—through the identification of a tag within an internal data frame as shown in FIG. 3*a* or through the identification of the end of an internal data frame as shown in FIG. 3—and can dimension the time thereafter for defining the LatchIN time.

Figure 4:
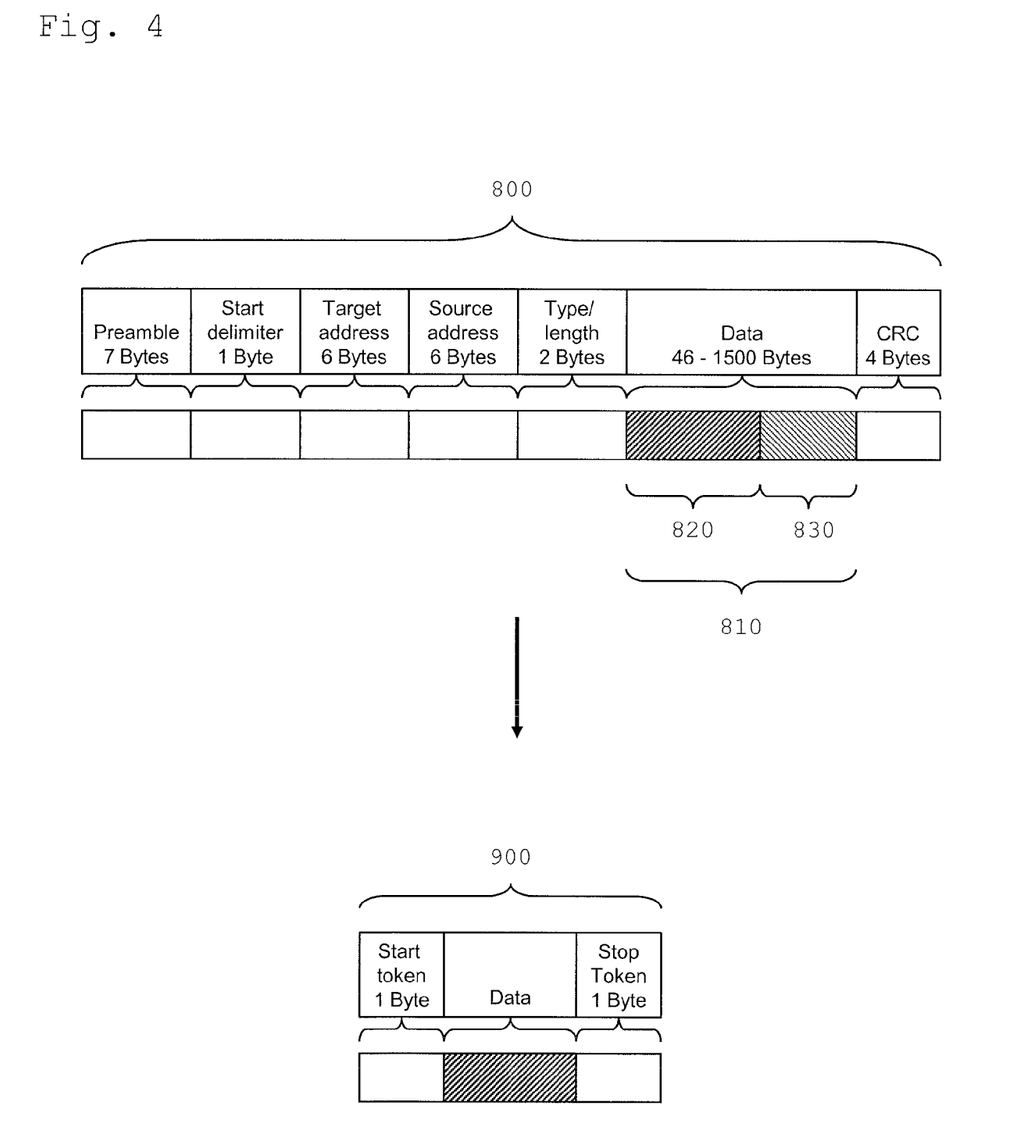
FIG. 4: schematically, the setup of an Ethernet telegram and the setup of an example internal data telegram in which a received Ethernet telegram is converted by a bus coupler according to the invention.

FIG. 4 shows, as an example, an Ethernet data frame 800 as well as a simple embodiment of an internal data telegram 900 that is generated by the bus coupler 500 from a received Ethernet data frame 800. In the embodiment shown, only data from the data area 810 of the Ethernet data frame 800 is incorporated into the internal data telegram 900.

The data area 810 of a data frame 800 conforming to Ethernet standards has at least 46 bytes of data, wherein user data 820 is optionally filled with filler data 830, in order to reach a total of at least 46 bytes. In order to guarantee the smallest possible data length for the internal data telegram 900, it is advantageously provided to identify the user data 820 and filler data 830 contained in the data area 810 of the Ethernet telegram 800 with the bus coupler 500 and to incorporate only the user data 820 as data in the internal data telegram 900.

The lower-level bus system 420 is in the position, through its setup, to transmit real-time data with low jitter and high data throughput. Diagnosis and parameter data do not change the time behavior of the system. Management information can also be transmitted without changing the time behavior. By concentrating on the user data of the Ethernet data frame, high efficiency in the internal data telegram in use is realized. The protocol is further advantageously applied such that a structured architecture is possible for the lower-level bus system 420.

In one especially preferred embodiment, the data transfer rate of the internal data telegram essentially matches the data transfer rate of the higher-level Ethernet telegram. Thus, because the internal telegram is shorter, more telegrams can be transmitted per unit time than can be received by the higher-level bus system.

In this way, either additional information, for example, for internal control, such as for safety-related systems, or management data could be transmitted.

What is claimed is:

1. A method for process control of an automation system in which data is exchanged between a network (410) formed for transmitting Ethernet telegrams and a lower-level bus system (420) via a bus coupler (500), wherein the bus coupler (500) is connected via a first interface (520) to the network (410) and via a second interface (530) to the lower-level bus system (420), and wherein process data is read in and/or output by at least one bus node (610, 620, 630) of the lower-level bus system (420), the method comprising:
- receiving an Ethernet telegram (800) via the first interface (520) of the bus coupler (500);
- converting the received Ethernet telegram (800) into an internal data telegram (900) that has a shorter data length than the received Ethernet telegram (800), wherein certain information of the Ethernet telegram are not incorporated into the internal data telegram during the conversion such that, after the conversion, the internal data telegram is not an Ethernet telegram; and
- outputting the internal data telegram (900) via the second interface (530) of the bus coupler (500) to the bus node (610, 620, 630) of the lower-level bus system (420), wherein the lower-level bus system uses a unique protocol instead of an Ethernet protocol.

2. The method according to claim 1, wherein the lower-level bus system (420) is formed as a ring-shaped bus system and data is transmitted between the bus coupler (500) and the bus nodes (610, 620, 630) of the lower-level bus system (420) by means of a sum frame protocol.

3. The method according to claim 1, wherein data is transmitted within the lower-level bus system (420) according to the master/slave principle, wherein the bus coupler (500) forms the master and the bus nodes (610, 620, 630) form the slaves.

4. The method according to claim 1, wherein the Ethernet telegram (800) is generated by a control unit (200) formed for controlling the bus nodes (610, 620, 630) connected to the lower-level bus system (420) and is transmitted via the network (410) to the bus coupler (500), wherein the data area (810) of the Ethernet telegram (800) contains individual data (820) for a plurality of bus nodes (610, 620, 630) connected to the lower-level bus system (420).

5. The method according to claim 1, wherein management data for controlling at least one bus node (610, 620, 630) of the lower-level bus system (420) is generated by the bus coupler (500) and inserted into the internal data telegram (900).

6. The method according to claim 1, wherein internal data telegrams (900) are regularly output at fixed, predetermined time intervals from the bus coupler (500) to the bus nodes (610, 620, 630) of the lower-level bus system (420), further comprising:
- allocating at least one output and/or read-in time interval (710, 720, 730, 740) for at least one of the bus nodes (610, 620, 630) of the lower-level bus system (420);
- identifying an output and/or read-in start time allocated by the internal data telegram (900) by the one or more bus nodes (610, 620, 630); and
- outputting process data by the one or more bus nodes (610, 620, 630) after the allocated output time interval (720, 740) has elapsed and after identification of the output start time and/or read-in of process data by the one or more bus nodes (610, 620, 630) after the allocated read-in time interval (710, 730) has elapsed and after identification of the read-in start time.

7. The method according to claim 6, wherein the output and/or read-in start time is allocated by a tag (750, 760) within the internal data telegram or by the end of the internal data telegram.

8. The method according to claim 6, wherein for each bus node (610, 620, 630) of the lower-level bus system (420), different output and/or read-in time intervals (710, 720, 730, 740) are allocated as a function of the corresponding position within the lower-level bus system (420) such that an output and/or read-in of process data takes place simultaneously for all bus nodes (610, 620, 630) of the lower-level bus system (420).

9. The method according to claim 1, wherein user data (820) and filler data (830) in the data area (810) of the Ethernet telegram (800) are identified and only the user data (820) are incorporated into the internal data telegram (900).

10. A bus coupler (500) for exchanging data between a network (410) constructed for transmitting Ethernet telegrams and a lower-level bus system (420), comprising:
- a first interface (520) for connecting to the network (410);
- a second interface (530) for connecting to the lower-level bus system (420); and
- a control unit (510) that is designed to convert an Ethernet telegram (800) received via the first interface (520) into an internal data telegram (900) and to output the internal data telegram via the second interface;
- wherein the internal data telegram (900) has a shorter data length than the received Ethernet telegram (800);
- wherein certain information of the Ethernet telegram are not incorporated into the internal data telegram during the conversion such that, after the conversion, the internal data telegram is not an Ethernet telegram; and
- wherein the lower-level bus system uses a unique protocol instead of an Ethernet protocol.

11. A bus node (610, 620, 630) for connecting to a ring-shaped bus system (420), comprising:
- a memory for storing a variably adjustable value for an output and/or read-in time interval; and
- a logic component for
  i) exchanging data with a bus master (500) on the basis of a sum frame protocol,
  ii) identifying an output and/or read-in start time allocated by the data frame circulating on the bus system (420), and
  iii) outputting process data after the allocated output time interval (720, 740) has elapsed, and after the identification of the output start time and/or reading in process data after the allocated read-in time interval (710, 730) has elapsed, and after the identification of the read-in start time.

12. The bus node according to claim 11, wherein the output and/or read-in start time is allocated by a tag (750, 760) within the internal data telegram or by the end of the internal data telegram.

13. A control system (10) comprising:
- a network (410) designed for transmitting Ethernet telegrams;
- a lower-level bus system (420) under the network (410);
- a bus coupler (500) according to claim 10 that is connected to the network (410) and to the lower-level bus system (420); and
- at least one bus node (610, 620, 630) connected to the lower-level bus system (420) according to claim 11.

14. A network coupler (500) comprising:
- an external interface (520) for connecting to a network (410) on which Ethernet telegrams (800) are able to be transmitted; and
- an internal interface (530) for connecting a plurality of nodes (610, 620, 630) in series in a ring-shaped transmission path (420), wherein the plurality of nodes are part of a lower-level bus system that uses a unique protocol instead of an Ethernet protocol;
- a control unit for converting the Ethernet telegram (800), received via the external interface, into a data telegram that has a shorter data length than the Ethernet telegram;

wherein certain information of the Ethernet telegram are not incorporated into the shortened data telegram during the conversion such that, after the conversion, the shortened data telegram is not an Ethernet telegram, wherein the shortened data telegram is forwarded to the internal interface (530) and output onto the ring-shaped transmission path (420), wherein, when the shortened data telegram (900) is circulated on the ring-shaped transmission path (420) by each node, the corresponding node (610, 620, 630) connected to the internal interface (530) exchanges the user data designated for the node with the shortened data telegram (900) as it circulates on the transmission path, and wherein the node is able to receive data from the data block allocated to the node in the data area of the shortened data telegram (900) and is able to insert, on its side, data into the data block allocated to the node in the data area of the shortened data telegram (900).

15. A method for exchanging data between a network (410) on which Ethernet telegrams (800) are able to be transmitted and a plurality of nodes (610, 620, 630) connected via a network coupler (500), the method comprising:

connecting the network (410) to an external interface (520) of the network coupler (500);

connecting the plurality of nodes (610, 620, 630) via an internal interface (530) of the network coupler (500) in series in a ring-shaped transmission path (420), wherein the plurality of nodes are part of a lower-level bus system that uses a unique protocol instead of an Ethernet protocol;

converting an Ethernet telegram (800) received via the external interface (520) of the network coupler (500) into a data telegram (900) shortened in length compared with the Ethernet telegram (800), wherein certain information of the Ethernet telegram are not incorporated into the shortened data telegram during the conversion such that, after the conversion, the shortened data telegram is not an Ethernet telegram;

forwarding the shortened data telegram to the internal interface (530) of the network coupler (500) and outputting it onto the ring-shaped transmission path (420); and when the shortened data telegram (900) circulates on the ring-shaped transmission path (420) by each subscriber, exchanging, via the corresponding node (610, 620, 630) connected to the internal interface (530), the user data designated for the node with the shortened data telegram (900) circulating on the transmission path, wherein the node is able to receive data from a data block allocated to the node in the data area of the shortened data telegram (900) and is able to insert, on its side, data into the data block allocated to the node in the data area of the shortened data telegram (900).

\* \* \* \* \*